(12) United States Patent
Rahman et al.

(10) Patent No.: US 8,472,917 B1
(45) Date of Patent: Jun. 25, 2013

(54) POSITION DETERMINATION FOR EMERGENCY CALL FROM MULTI-MODE MOBILE STATION

(75) Inventors: Iftekhar Rahman, Billerica, MA (US); Mingxing Li, San Jose, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 46 days.

(21) Appl. No.: 12/973,575

(22) Filed: Dec. 20, 2010

(51) Int. Cl.
*H04M 11/04* (2006.01)

(52) U.S. Cl.
USPC .......... 455/404.1; 455/435.2; 455/435.3; 455/404.2; 455/456.1; 455/456.3

(58) Field of Classification Search
USPC .......... 455/404.2, 435.2, 435.3, 456.1, 456.3
See application file for complete search history.

(56) References Cited

U.S. PATENT DOCUMENTS

| | | | | |
|---|---|---|---|---|
| 2003/0222819 A1* | 12/2003 | Karr et al. | ..................... | 342/457 |
| 2003/0222820 A1* | 12/2003 | Karr et al. | ..................... | 342/457 |
| 2007/0081523 A1* | 4/2007 | Mishra | ........................... | 370/352 |
| 2008/0252518 A1* | 10/2008 | Yeshayahu | ............... | 342/357.02 |
| 2009/0233620 A1* | 9/2009 | Fischer et al. | ............. | 455/456.1 |
| 2010/0177629 A1* | 7/2010 | Payyappilly et al. | ......... | 370/216 |
| 2010/0284366 A1* | 11/2010 | Zhu | ................................ | 370/331 |

OTHER PUBLICATIONS

"Routing control plane," Nov. 19, 2010. <http://en.wikipedia.org/wiki/Routing_control_plane>.
Kirk Burroughs et al., "GHRC LBS Overview," Mar. 2005, Qualcomm CDMA Technologies.

* cited by examiner

*Primary Examiner* — Wayne Cai
*Assistant Examiner* — Chuck Huynh (57) ABSTRACT

In the examples, at the start of an emergency call, a mobile station determines one or more types of wireless access technologies available from the mobile communication network, from among wireless access technologies supported by the mobile station. Based on a hierarchy regarding ability to determine location of the mobile station using each of the supported wireless access technologies, the mobile station selects an available wireless access technology of the mobile communication network offering the best ability to determine location of the mobile station and initiates a determination of the location of the mobile station for purposes of the emergency call via the mobile communication network using the selected wireless access technology.

11 Claims, 3 Drawing Sheets

POSITION DETERMINATION FOR EMERGENCY CALL FROM MULTI-MODE MOBILE STATION

TECHNICAL FIELD

The present subject matter relates to techniques and equipment to select an appropriate wireless access technology for determination of position of a multi-mode mobile station making an emergency call.

BACKGROUND

With the development of multiple air interface standards in mobile wireless, there is an increasing need for devices to support several air interface modes, e.g., Global System for Mobile Communications (GSM), Enhanced Data rates for GSM Evolution (EDGE), 1x Radio Transmission Technology (1xRTT), Evolution-Data Optimized (EvDO) for High Rate Packet Data (HRPD) service and Evolved HRPD (eHRPD) service, Long Term Evolution (LTE) for Universal Mobile Telecommunications System Terrestrial Radio Access (UTRA) service or Evolved UTRA (eUTRA). At the same time the need for accurate device position determination in mobile wireless is growing. Position determination requires the device to take radio measurements. The radio could be a Global Positioning System (GPS) radio and a radio for one of the previously mentioned air interfaces. The position determination could be done by the device itself, with the assistance of a server or by a server with the measurements provided by the device to the server.

Generally speaking, mobile devices operate (both receive and transmit) in only one mode at a time, i.e., using only one interface at a time. Consequently, it follows that the mode that the device is operating in at any one time will be the preferred mode for taking air interface measurements and performing the position determination. This assumes that the position determination technology can make use of the measurements from that particular air interface. This may not always be the case.

For example, in a multi-mode device that supports both 4G and 3G air interfaces, e.g., LTE, EvDO (for eHRPD and HRPD services) and 1xRTT, positioning technologies exist for 1xRTT measurements and are being developed for LTE. Technologies do not exist nor are they being planned for EvDO. Note that with the convergence of voice and data and the need for higher capacity propelling, operators go to Voice over IP so that all services can work simultaneously. The problem is particularly acute for E911 (Emergency 911) where positioning accuracy is mandated by the Federal Communications Commission (FCC).

SUMMARY

An improved approach, which may address problems like that outlined above, involves selecting the air interface on an emergency call based on ability to determine location, e.g., instead of relying simply on the current operating mode. In one general aspect, a method described includes steps of upon detecting a start of an emergency call from a mobile station through a mobile communication network, determining one or more types of wireless access technologies available to the mobile station from the mobile communication network at the time of the emergency call, from among a plurality of wireless access technologies supported by the mobile station; comparing the determined one or more types of available wireless access technologies to a hierarchy regarding ability to determine location of the mobile station using each of the supported wireless access technologies to select a wireless access technology of the mobile communication network offering the best available ability to determine location of the mobile station; and initiating a determination of the location of the mobile station for purposes of the emergency call via the mobile communication network, using the selected wireless access technology.

The above general aspect may include one or more of the following features. The wireless access technologies supported by the mobile station may include two or more wireless access technologies selected from the group consisting of 1x Radio Transmission Technology (1xRTT), Long Term Evolution (LTE) and Evolution-Data Optimized (EvDO). The comparing step may further include determining if 1xRTT is available from among 1 xRTT, LTE, and EvDO; and if 1 xRTT is available, the mobile station may be instructed to operate in 1 xRTT mode and select 1 xRTT measurements for position determination. If 1xRTT is not available, the comparing step may further include determining if LTE is available from among LTE and EvDO. Upon determining LTE is available, the mobile station may be instructed to operate in the LTE mode and select LTE measurements for position determination.

The method may further involve determining before the position determination is completed using the LTE that the mobile station is handed down to the EvDO. In such a situation, if 1xRTT is available, the mobile station may select 1xRTT measurements for position determination but may use the EvDO to transport the 1xRTT measurements to a location server.

The method may further involve determining before the position determination is completed using the LTE that the mobile station is handed down to the EvDO, but the 1 xRTT is not available. In this case, the mobile station may be instructed to send EvDO base station identifiers to a location server for position determination.

The comparing step may further include determining if 1 xRTT is available from among 1 xRTT, LTE, and EvDO. Upon determining that 1 xRTT is not available, the station may determine if LTE is available from among LTE and EvDO. Upon determining LTE also is not available, the mobile station may be instructed to operate in EvDO and select EvDO for position determination.

Implementations of the described techniques may include hardware, such as an appropriately configured mobile device, a method or process, or software for a mobile device on a computer-accessible medium.

The details of one or more implementations are set forth in the accompanying drawings and the description below. Other features will be apparent from the description and drawings, and from the claims.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples of methods and communication systems discussed below relate to using LTE measurements for positioning when the user is making an E911 call and the device is operating on LTE and using 1xRTT measurements for positioning when the user is making an E911 call and the device is operating on 1xRTT and eHRPD.

Figure 1:
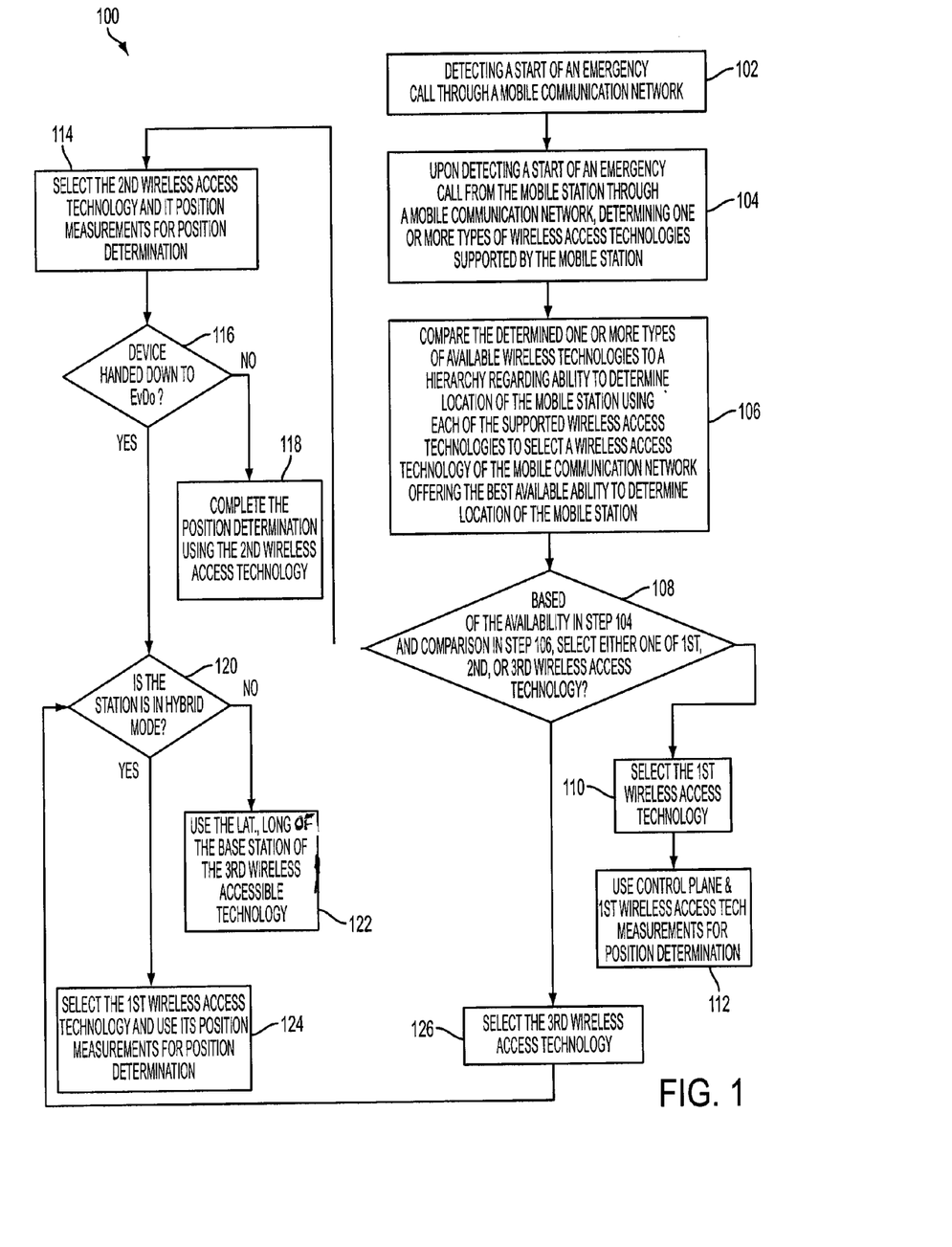
FIG. 1 illustrates an exemplary process flow for handling of location related functions in a mobile station, during emergency calls such as E911 calls.

Reference now is made in detail to the examples illustrated in the accompanying drawings and discussed below. FIG. 1 illustrates an example of a process 100 flow for handling of location related functions in a mobile station, during emergency calls such as E911 calls. The process 100 begins upon the mobile station detecting a start of an emergency call through a mobile communication network (Step 102). In one implementation, the mobile station is programmed to recognize the emergency number (e.g., 911) associated with its home country (e.g., the United States). In another implementation, the mobile station is programmed to recognize a plurality of emergency numbers. To this end, the mobile station may include a table listing the plurality of emergency numbers and their corresponding country. The mobile station compares the received number with the emergency numbers stored in the table to identify whether the received number is one of the ones stored in its table.

Upon detecting a start of an emergency call from the mobile station through a mobile communication network, the mobile station determines one or more types of wireless access technologies available to the mobile station from the mobile communication network at the time of the emergency call, from among the various wireless access technologies supported by the mobile station (Step 104). The various wireless access technologies supported by the mobile station may include 1xRTT, LTE, and EvDO.

The mobile station may compare the determined one or more types of available wireless access technologies to a hierarchy regarding ability to determine location of the mobile station using each of the supported wireless access technologies. Based on the hierarchy, the mobile station selects a wireless access technology of the mobile communication network offering the best available ability to determine location of the mobile station (Step 106). In one implementation, the hierarchy directs the mobile station to select 1 xRTT when 1 xRTT is available from among 1 xRTT, LTE, and EvDO, select LTE when 1 xRTT is not available but LTE is available from among LTE and EvDO, and select EvDO when 1 xRTT and LTE are not available.

Based on the availability determined in Step 104 and the comparison in Step 106, the mobile station may select one of the first, second, or third wireless access technologies for position determination (Step 108). The first wireless access technology may refer to the 1xRTT; the second wireless access technology may refer to LTE; and the third wireless access technology may refer to EvDO. In one specific example, as noted above, the mobile station may select 1 xRTT when 1 xRTT is available, select LTE when 1 xRTT is not available but LTE is available, and select EvDO when 1xRTT and LTE are not available.

Toward this end, the mobile station may first determine if the first wireless access technology (e.g., 1xRTT) is available for position determination based on the availability and comparison steps conducted in Steps 104 and 106. If so, the mobile station may select 1xRTT (Step 110) regardless of availability of the other wireless access technologies (e.g., LTE or EvDO). The mobile station sets up a call over the 1xRTT RAN, and because it has access to 1x radio measurements, it can support a Control Plane positioning protocol that is initiated by a Position Determining Entity (PDE) (Step 112).

The 1x radio measurements consist of measuring the phase of the pilot signals being broadcast by neighboring 1xRTT base stations, with reference to the phase of the pilot signal being broadcast by the serving 1xRTT base station. In the Control Plane positioning protocol, the PDE does not set up a data connection to the mobile station directly. Instead, the PDE sets up a data connection to the Mobile Switching Center (MSC) that is responsible for setting up the E911 voice call between the mobile station and the Public Safety Answering Point (PSAP). This data connection between the PDE and the MSC is used to carry the Positioning Protocol messages that will be exchanged between the PDE and the mobile station. The messages that are going from the PDE to the mobile station is then inserted by the MSC in the signaling/control portion of the voice call going from the PSAP (and through the MSC) to the mobile station.

The messages that are going from the mobile station to the PDE are included in the signaling/control portion of the voice call going from the mobile station (and through the MSC) to the PSAP. These messages are removed from the signaling/control portion of the voice call going from the mobile station (and through the MSC) to the PSAP, at the MSC. The MSC then uses the data connection to the PDE to send these messages. Typically, the messages from the PDE to the mobile station contain information about GPS orbits. The messages from the mobile station to the PDE contain the 1x radio measurements mentioned above, information about the 1xRTT base stations that are broadcast by those base stations, e.g., Base Station Identifiers, and, measurements of the GPS radio signals as well as other information that may be broadcast by the GPS space system elements (satellites). The end result is that the mobile station location can be determined by the PDE and provided to the PSAP as required by the FCC Mandate for Phase II E911 call support. This ends the process 100.

Upon determining that 1xRTT is not available, the mobile station may then determine if the second wireless access technology (e.g., LTE) is available for position determination based on availability and comparison steps 104 and 106 (Step 108). If so, the mobile station may select LTE and its position measurements for position determination (Step 114). In this scenario, the mobile station sets up a call over the eUTRAN, and because it has access to eUTRAN radio measurements, it can support a User Plane positioning protocol that is initiated by a Secure User Plane Location (SUPL) Location Platform (SLP).

The eUTRAN consists of a set of base stations (eNodeBs) that use Orthogonal Frequency Division Multiplexing (OFDM) radio technology and variants of it for the radio transmissions to and from the mobile stations. In an evolved UMTS RAN, the eNodeBs can route transmissions between each other without having to go through other network elements. For the eUTRAN radio signal measurements, the mobile station will measure the time of arrival of certain information (predetermined bits) coming from neighboring eNodeBs, relative to the time of arrival of other information (predetermined bits) coming from the serving eNodeB. In an User Plane positioning protocol, the server and the mobile station set up a data connection over which they exchange messages without requiring the intervention of the network elements that are in the path of the physical connection between the server and the mobile station, as is required for the Control Plane positioning protocol between the location server and the mobile station. For Secure User Plane Location (SUPL) protocol, before the server (the SUPL Location Platform or the SLP for short) and the mobile station can exchange messages to determine the location, an authentication/security mechanism between the server and the mobile station may first be completed to make the transactions "secure." The SLP consists of two parts, a SLC (SUPL Location Center) that is responsible for the authentication/security mechanism and a SPC (SUPL Positioning Center) that is responsible for positioning protocol that is used to determine the location/position of the mobile station.

The positioning protocol is packaged inside the SUPL Protocol. The positioning protocol is used primarily to exchange positioning messages between the SLP and the mobile station. Typically, the messages from the SLP to the mobile station contains information about GPS orbits and the pre-determined (information) bits transmitted by the eNodeBs. The messages from the mobile station to the SLP contain the eUTRAN radio measurements mentioned above, information about the eNodeBs that are broadcast by these eNodeBs, e.g., eNodeB Identifiers, and, measurements of the GPS radio signals as well as other information that may be broadcast by the GPS space system elements (satellites).

If the mobile station stays in LTE mode until the positioning session is completed, then the end result is that the station location can be determined by the SLP and provided to a PSAP as required by the FCC Mandate for Phase II E911 call support. This ends the process. If on the other hand, before the positioning session is completed, the mobile station is handed down from LTE to eHRPD, the mobile station will perform further position determination. It is possible that during the position determination using the LTE, the mobile station is handed down to another wireless access technology (e.g., EvDO). If so, the mobile station may demine if the mobile station is in hybrid mode, i.e., it can select a 1xRTT RAN and an associated EvDO RAN simultaneously. If so, the mobile station may use the 1xRTT air interface for taking the 1xRTT signal measurements, but use the EvDO air interface to set up SUPL Location Protocol but with 1xRTT Positioning Protocol (e.g., IS-801-1) both aGPS positioning and AFLT (Advanced Forward Link Trilateration, a positioning technique that uses 1xRTT pilot signal phase measurements).

Referring again to FIG. 1, after determining that the available air interface is the LTE, the mobile station determines if it has been handed down to the third wireless access technology (e.g., EvDO) during the position determination (Step 116). If not (Step 116, No), the mobile station completes position determination using the LTE measurements for LTE assisted GPS (aGPS) position determination (Step 118). If the mobile station determines that it has been handed down to the EvDO (Step 116, Yes), the mobile station then determines if it is operating in a hybrid mode (Step 120). In particular, the mobile station checks to see if in addition to EvDO air interface access to the 1xRTT air interface is available. If not (Step 120, No), the Location Server (e.g., SLP) uses the lat, long of the EvDO base station for position determination (Step 122). If yes (Step 120, Yes), the mobile station selects the 1xRTT air interface and its position measurements for position determination (Step 124), and the mobile station sends this information over eHRPD/EvDO.

Returning to Step 108, if it is determined that neither the 1xRTT nor the LTE is available but the EvDO is available based on the availability and the comparison Steps 104 and 106, the mobile station then selects the EvDO and its position measurements for position determination (Step 126). The mobile station during the position determination using the EvDO technology may check to determine if other air interfaces have become available. For example, the mobile station may routinely determine if it is in hybrid mode (Step 120). If not (Step 120, No), the mobile station sends the EvDO base station ID as part of the SUPL/RRLP Location Protocol/Positioning Protocol. The SLP then uses the lat, long of the EvDO base station for position determination (Step 122). Since only the EvDO radio interface is available, and there is no positioning technology supported for the EvDO radio, the mobile station cannot support a User Plane positioning protocol that is initiated by a SLP over eHRPD but can only send the serving EvDO base station information (Step 122). The end result is that the mobile station location that is determined by the SLP and provided to the PSAP is the latitude and longitude of the EvDO base station. This ends the process.

If, however, the mobile station is in hybrid mode (Step 120, Yes), the mobile station selects the 1xRTT air interface and its signal measurements to send to the SLP over the EvDO interface for position determination (Step 124). Since the mobile station is in hybrid mode it can turn on the 1x radio and take 1x signal measurements, and thereby support a User Plane positioning protocol that is initiated by a SLP over eHRPD. The end result is that the mobile station location can be determined by the SLP and provided to the PSAP as required by the FCC Mandate for Phase II E911 call support. This ends the process.

Figure 2:
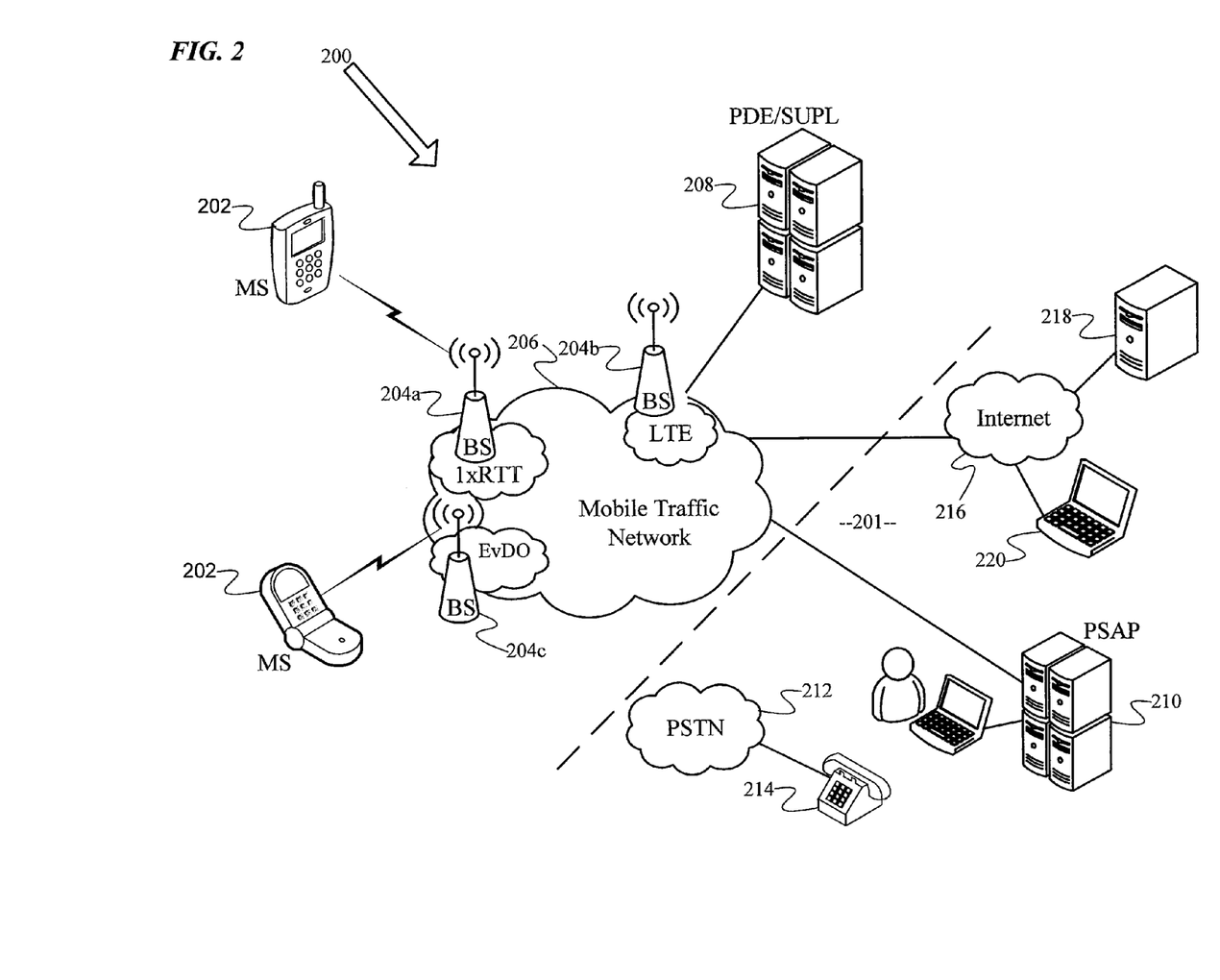
FIG. 2 is a high-level, functional block diagram, of network(s) and systems for mobile communication, including emergency call processing of the type exemplified by the process of FIG. 1.

FIG. 2 is a high-level, functional block diagram, of network(s) and systems for mobile communication, including emergency call processing of the type exemplified by the process of FIG. 1. The elements indicated by the reference numeral 200 generally are elements of the network and are operated by or on behalf of the carrier, although the mobile stations typically are sold to the carrier's customers. The mobile communication network 200 provides communications between mobile stations as well as communications for the mobile stations with networks and stations outside the mobile communication network 200 represented generally at 201 in the drawing.

The wireless mobile communication network 200 might be implemented as a network conforming to the code division multiple access (CDMA) IS-95 standard, the 3rd Generation Partnership Project 2 (3GPP2) wireless IP network standard or the EvDO standard, the Global System for Mobile (GSM) communication standard, a time division multiple access (TDMA) standard or other standards used for public mobile wireless communications. The mobile stations 202 may be capable of conventional voice telephone communications and data communications. A variety of different types of mobile stations supporting such communications are widely available.

Several mobile stations 202 appear in the drawing, to represent examples of the mobile stations that may receive various services via the mobile communication network 200. Today, mobile stations typically take the form of portable handsets, smart-phones or personal digital assistants, although they may be implemented in other form factors.

The mobile communication network 200 typically is implemented by a number of interconnected networks. Hence, the overall network 200 may include a number of radio access networks (RANs), as well as regional ground networks interconnecting a number of RANs and a wide area network (WAN) interconnecting the regional ground networks to core network elements. A regional portion of the network 200, such as that serving mobile stations 202 will typically include one or more RANs and a regional circuit and/or packet switched network and associated signaling network facilities.

Physical elements of a RAN operated by one of the mobile service providers or carriers, include a number of base stations represented in the example by the base stations (BSs) 204a-204c. An LTE base station is called eNodeB, except that eNodeB is more than that. The eNodeB is equivalent to the 2G/3G base station and base station controller. As noted earlier, many mobile wireless communications networks have been deployed and are available today. For purposes of discussion, the network 200 includes 3GPP2 (1xRTT and EvDO) technology network and a 3GPP (LTE/GSM/UMTS) technology network. To this end, BSs 204a, 204c would utilize 3GPP2 (1xRTT and EvDO) type transceiver equipment and implement communications in accord with the protocols of the application 3GPP2 standard, for signaling, registration, voice communication, data communication, etc; whereas BS 204b would utilize 3GPP (LTE) type transceiver equipment and implement communications in accord with the protocols of the application 3GPP standard, for signaling, registration, voice communication, data communication, position determination etc.

For example, BS 204a will broadcast certain standardized information to allow a mobile devices 202 in the region to search for, find and lock-onto the base station 204a and acquire information needed to register and initiate communications via the network 206, all in accord with the standard 3GPP2 protocol (1xRTT). The BS 204b will broadcast certain standardized information to allow a mobile devices 202 in the region to search for, find and lock-onto the base station 204b and acquire information needed to register and initiate communications via the network 206, all in accord with the standard 3GPP protocol (LTE). The BS 204c will broadcast certain standardized information to allow a mobile devices 202 in the region to search for, find and lock-onto the base station 204c and acquire information needed to register and initiate communications via the network 206, all in accord with the standard 3GPP2 protocol (EvDO).

Although not separately shown, such base stations 204a-204c typically each includes a base transceiver system (BTS) which communicates via an antennae system at the site of base station and over the airlink with one or more of the mobile stations 202, when the mobile stations 202 are within range. Each base station typically includes a BTS coupled to several antennae mounted on a radio tower within a coverage area often referred to as a "cell." The BTS is the part of the radio network that sends and receives RF signals to/from the mobile stations 202 that the base station 204a-204c currently serves.

The radio access networks also include a traffic network represented generally by the cloud at 206, which carries the user communications for the mobile stations 202 between the base stations (for 2G and 3G there is no communication between base stations; the communication is only in LTE, between eNodeBs) and other elements with or through which the mobile stations communicate. In some examples, the mobile traffic network 206 includes or communicates with network elements that support E-911 and location based services (LBSs) such as, for example, PDE/SUPL 208 and PSAP 210. The network 206 can also include other elements, which are not shown, that support functionality other than E-911 service. Examples include MSCs, signal transfer points (STP), mobile positioning center (MPC), message centers (MCs), home location registries (HLRs), and other network elements such as wireless interne gateways (WIGs), visitor location registers (VLRs), and Gateway nodes and Serving Nodes (both of which are 3GPP terms) (not shown). Other individual elements such as switches and/or routers forming the traffic network 206 are omitted here form simplicity. It is understood that the various network elements can communicate with each other and other aspects of the mobile communications network 200 and other networks (e.g., PSTN 212 and Internet 216) either directly or indirectly.

The MSC is responsible for managing communications between the mobile station and the other elements of the network 200 for circuit switched voice calls. For VoIP over eHRPD or LTE, it will be a IMS (IP Multi-media service) Packet Data Network Gateway (P-GW). In addition, the MSC is responsible for handling voice calls and messaging service message requests as well as other services (such as conference calls, FAX and circuit switched data). The MSC sets up and releases the end-to-end connection, handles mobility and hand-over requirements during the call. The MSC is sometimes referred to as a "switch". The MSC manages the cell sites, the voice trunks, voicemail, and SS7 links.

The PDE/SUPL 208 is a network element that manages the position or geographic location determination of each mobile station 202. In aGPS type deployment, for example, PDE/SUPL 208 provides data to mobile station 202 to expedite satellite acquisition; and it may determine the actual latitude and longitude (final fix) of a mobile station 202 based on GPS measurements or radio signal measurements using one of the air interfaces mentioned earlier taken by mobile station 202 at the PDE/SUPL's request.

The network 200 may enable communication with PSAP 210. The PSAP 210 includes a server, typically implemented in a call center responsible for handling emergency calls such as calls for police, ambulance and firefighter services. A PSAP 210 normally receives voice telephone calls. However, discussion here focuses on location related functionality, including that of the PSAP server 210. Most PSAPs 210 are capable of locating callers using landline phones and many can handle mobile phones if the mobile service provides for such capability.

To comply with the 911 mandate, the mobile service providers should provide a mechanism for locating subscribers within their respective mobile network. The 911 mandate requires that the mobile service providers locate their respective subscribers within fifty (50) meters sixty-seven percent (67%) of the time and locate their respective subscribers within one-hundred-fifty (150) meters ninety-five (95%) of the time. The mandate is subject to change and may be amended to require a more accurate position determination.

Position determination requires the device to take radio measurements. The radio could be a GPS radio receiver and a radio transceiver for one or more of the previously mentioned air interfaces (e.g., 1xRTT, LTE, EvDO). The position determination could be done by the device itself, with the assistance of a server or by a server with the measurements provided by the device to the server. Generally speaking, devices operate (both receive and transmit) in only one mode at a time. Consequently, it follows that the mode that the device is operating in at any one time will be the preferred mode for taking air interface measurements and performing the position determination. This assumes that the position determination technology can make use of the measurements from that particular air interface. As noted in the background section, however, this may not always be the case. For example, in a multi-mode device that supports both 4G and 3G air interfaces, e.g., LTE, EvDO (for eHRPD and HRPD services) and 1xRTT, positioning technologies exist for 1xRTT measurements and are being developed for LTE. Technologies do not exist nor are they being planned for EvDO. To this end, the instant application describes using LTE measurements for positioning when the user is making an E911 call and the device is operating on LTE and using 1xRTT measurements for positioning when the user is making an E911 call and the device is operating on either of the 1xRTT and EvDO air interfaces.

To this end, the exemplary network 200 may enable radio measurements (e.g., GPS radio and/or a radio for one of the previously mentioned air interfaces measurements) for determining the location of the mobile station. The mobile station may interact with the PDE/SUPL 208 to process those measurements so as to determine the latitude and longitude (and possibly altitude) of the current location of the mobile station 202. The PDE/SUPL system 208 is essentially a general purpose programmable device with an interface for data communication via the network 200 running server software and running programming for implementation of the PDE/SUPL functions, such as device authentication, data cache and processing queue management. The PDE/SUPL 208 stores (e.g. in cache memory) or has access to a complete and up to date set of the satellite data for the constellation of GPS satellites needed to allow computation of position based on pseudorange measurements of satellite signals by mobile stations 202. The data may include that associated with the entire constellation but will at least include the data for the satellites expected to be broadcasting into the geographic region serviced by the network 200.

With an aGPS approach, for example, when a mobile station 202 attempts a GPS position fix, the mobile station 202 provides information (signal measurements using one of the air interfaces mentioned earlier) allowing the PDE/SUPL 208 to perform a pre-fix. Typically, the mobile station 202 will provide data identifying the base station through which it is receiving service (and possibly the serving sector). In some implementations, the PDE/SUPL 208 may receive data regarding several base stations/sectors and signal strengths thereof, for trilateration. The PDE/SUPL 208 uses information about base station location(s) to process the data received from the mobile station so as to determine a region (e.g. area of the cell or sector, or a general area triangulated based on signals from several base stations) that the mobile station 202 is likely located within. The PDE/SUPL 208 then uses the pre-fix location to parse the satellite data down, to assistance data that the mobile station 202 at the particular location needs in order to take GPS readings. The PDE/SUPL 208 sends the parsed satellite data to the mobile station 202, for use in taking measurements of signals from appropriate satellites. The GPS assistance data may contain selected satellite almanac, satellite visibility, Doppler and clock correction information.

The mobile station 202 will, in turn, use this information (also known as acquisition assistance records) to take multiple satellite pseudorange measurements. Depending on the device/network configuration, the mobile station 202 or the PDE/SUPL 208 can then calculate a final fix using these pseudorange measurements. The final fix computation provides latitude and longitude (and possibly altitude) coordinates for the current location of the mobile station 202. If the mobile station 202 has full GPS computation capability, the station 202 would know its current latitude and longitude and would communicate that data to the PDE/SUPL 208 through the network 200. In other cases, however, the mobile station 202 has only measurement capability, and the station forwards the measurement data to the PDE/SUPL 208 to determine the final fix. In either case, the GPS processing leads to a situation in which the PDE/SUPL 208 knows the latitude and longitude of the mobile station 202. If necessary, the PDE/SUPL 208 can provide coordinates to the mobile station 202 or to another element that needs or has requested the location of the particular mobile station 202, such as the PSAP 210 receiving a 911 call from the mobile station.

The traffic network portion 206 of the mobile communication network 200 connects to a public switched telephone network 212. This allows the network 200 to provide voice grade call connections between mobile stations and regular telephones connected to the PSTN 212. The drawing shows one such telephone at 214. The traffic network portion 206 of the mobile communication network 200 also connects to a public packet switched data communication network, such as the network commonly referred to as the "Internet" shown at 216. Packet switched communications via the traffic network 206 and the Internet 216 may support a variety of user services through the network 200, such as mobile device communications of text and multimedia messages, e-mail, web surfing or browsing, programming and media downloading, etc. For example, the mobile devices may be able to receive messages from and send messages to user terminal devices, such as personal computers, either directly (peer-to-peer) or via various servers 218. The drawing shows one user terminal device as a personal computer (PC) at 220, by way of example.

Those skilled in the art presumably are familiar with the structure, programming and operations of the various type of mobile stations. However, for completeness, it may be useful to consider the functional elements/aspects of exemplary mobile station 202, at a high-level.

Figures 3, 4, 5:
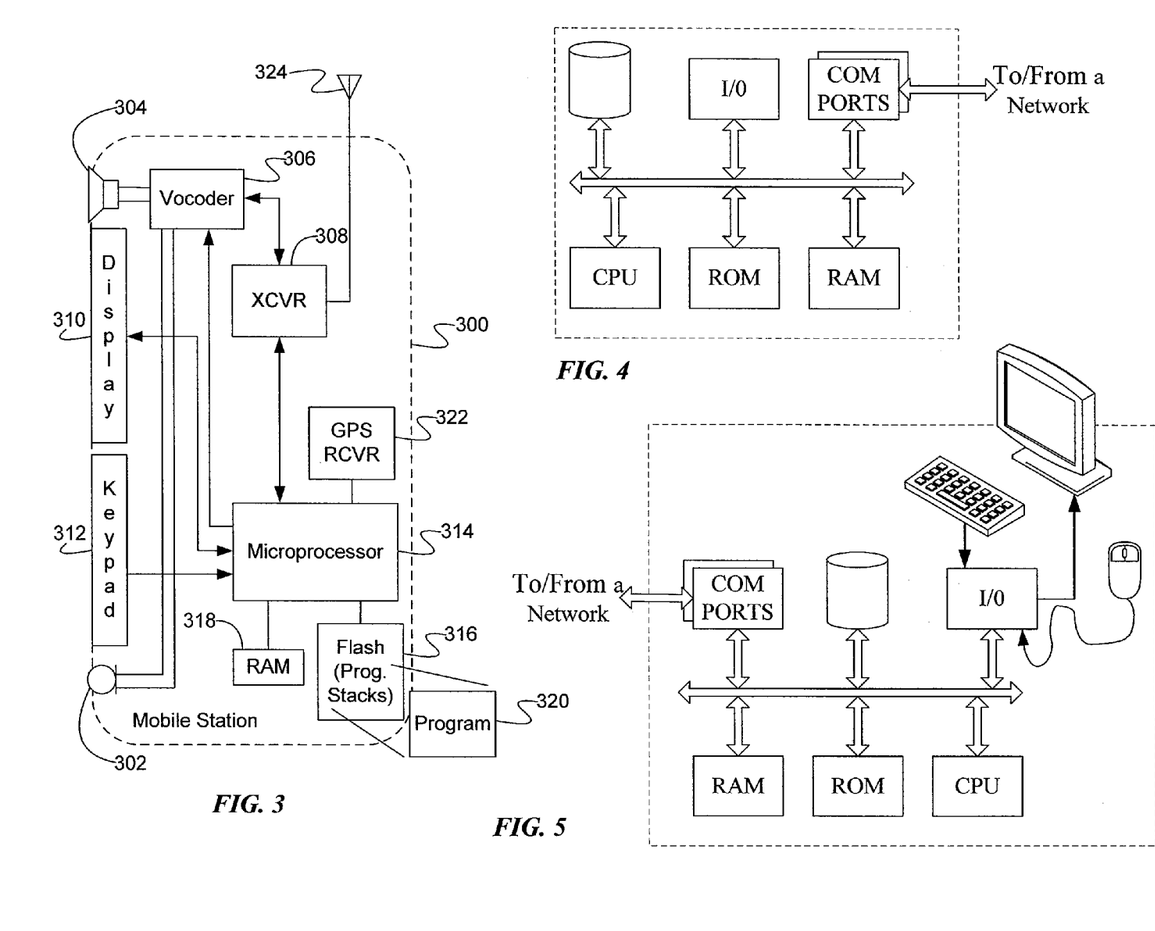
FIG. 3 is a high-level functional block diagram of a mobile station as may communicate through a network/system like that shown in FIG. 2, including to handle location aspects of emergency calls in the manner represented by the process flow of FIG. 1.
FIG. 4 is a simplified functional block diagram of a computer that may be configured as a host or server, for example, to function as the Position Determining Entity/Secure User Plane Location (PDE)/(SUPL) server or the host computer of the Public Safety Answering Point (PSAP) in the system of FIG. 2 and/or as a management server for downloading programming to a mobile station like that of FIG. 3.
FIG. 5 is a simplified functional block diagram of a personal computer or other work station or terminal device.

FIG. 3 is a high-level functional block diagram of a mobile station as may communicate through a network/system like that shown in FIG. 2, including to handle location aspects of emergency calls in the manner represented by the process flow of FIG. 1. Although the wireless device 300 may be a smart-phone or may be incorporated into another device, such as a portable personal computer, personal digital assistant (PDA) or the like, for discussion purposes, the illustration shows the wireless device 300 in the form of a handset. The handset embodiment of the wireless device 300 functions as a normal digital wireless telephone station. For that function, the wireless device 300 includes a microphone 302 for audio signal input and a speaker 304 for audio signal output. The microphone 302 and speaker 304 connect to voice coding and decoding circuitry (vocoder) 306. For a voice telephone call, for example, the vocoder 306 provides two-way conversion between analog audio signals representing speech or other audio and digital samples at a compressed bit rate compatible with the digital protocol of wireless telephone network communications or voice over packet (Internet Protocol) communications.

For digital wireless communications, the wireless device 300 also includes at least one digital transceiver (XCVR) 308 for calls through a mobile communication network and for determining location of the mobile station. The XCVR 308 supports a plurality of wireless access technologies. Specifically, the XCVR 308 is configured to support communication with 1xRTT RAN, LTE RAN, and EvDO RAN. The wireless devices 300 is a multimode device capable of operations on various technology type networks. For example, the wireless device 300 may utilize either or both of 3GPP2 (1xRTT and EvDO) technologies and 3GPP (LTE/GSM/UMTS) technologies. For that purpose, the XCVR 308 could be a multimode transceiver, or the wireless device 300 may include two or more transceivers each of which supports a subset of the various technologies or modes. The concepts discussed here encompass embodiments of the wireless device 300 utilizing any digital transceivers that conform to current or future developed digital wireless communication standards.

The XCVR 308 provides two-way wireless communication of information, such as vocoded speech samples and/or digital message information, in a selected one of the technology modes. The XCVR 308 also sends and receives a variety of signaling messages in support of the various voice and data services provided via the wireless device 300 and the communication network (described earlier with regard to FIG. 2). Each XCVR 308 connects through RF send and receive amplifiers (not separately shown) to an antenna 324. In the example, the XCVR 308 is configured for RF communication in accord with a digital wireless protocol, such as the current 3GPP2 and 3GPP protocols.

The wireless device 300 includes a display 310 for displaying messages, menus or the like, call related information dialed by the user, calling party numbers, etc. A keypad 312 enables dialing digits for voice and/or data calls as well as generating selection inputs, for example, as may be keyed-in by the user based on a displayed menu or as a cursor control and selection of a highlighted item on a displayed screen. The display 310 and keypad 312 are the physical elements providing a textual or graphical user interface. In addition to normal telephone and data communication related input/output, these elements also may be used for display of menus and other information to the user and user input of selections. Various combinations of the keypad 312, display 310, microphone 302 and speaker 304 may be used as the physical input output elements of the GUI, for multimedia (e.g. audio and/or video) communications. Of course other user interface elements may be used, such as a stylus and touch sensitive display screen, as in a PDA or smart phone.

A microprocessor 314 serves as a programmable controller for the wireless device 300, in that it controls all operations of the wireless device 300 in accord with programming that it executes, for all normal operations, and for operations involved in selecting a preferred technology type for position determinations during emergency calls. In one implementation, microprocessor 314 is configured to control the XCVR 308 during emergency calls from the mobile station 300 to perform functions including determine one or more types of wireless access technologies available to the mobile station 300 from the mobile communication network at the time of an emergency call; compare the determined one or more types of available wireless access technologies to a hierarchy regarding ability to determine location of the mobile station 300 using each of the supported wireless access technologies to select a wireless access technology of the mobile communication network offering the best available ability to determine location of the mobile station 300; and via the selected wireless access technology, initiate a determination of the location of the mobile station 300 for purposes of the emergency call through the mobile communication network.

The wireless device 300 includes flash type program memory 316, for storage of various "software" or "firmware" program routines and mobile configuration settings, such as mobile directory number (MDN) and/or mobile identification number (MIN), etc. The wireless device 300 may also include a non-volatile random access memory (RAM) 318 for a working data processing memory. Of course, other storage devices or configurations may be added to or substituted for those in the example. In a present implementation, the flash type program memory 316 stores firmware such as a boot routine, device driver software, an operating system, call processing software and vocoder control software, and any of a wide variety of other applications, such as client browser software and short message service software. The memories 316, 318 also store various data, such as telephone numbers and server addresses, downloaded data such as multimedia content, and various data input by the user.

Programming for the wireless device 300 includes programming 320 for establishing a hierarchy for selection of one of the wireless access technologies supported by the XCVR 308 available from the mobile communication network when the mobile station 300 initiates an emergency call. In accordance with the hierarchy, the mobile station 300 may select the 1 xRTT when the 1 xRTT is available from among the 1xRTT, LTE, and EvDO, select the LTE when the 1xRTT is not available but the LTE is available from among the 1xRTT, LTE, and EvDO, and select the EvDO when the 1xRTT and the LTE are not available from among the 1xRTT, LTE, and EvDO. The programming 320 may be stored in the memories 316 and/or 318.

The wireless device 300 also includes a GPS 322. The GPS 322 may be used to identify the location of the wireless device 300.

The structure and operation of the mobile station 300, as outlined above, were described to by way of example, only.

As shown by the above discussion, functions relating to programming in storage accessible to the processor for establishing a hierarchy for selection of one of the wireless access technologies supported by the transceiver available from the mobile communication network when the mobile station initiates an emergency call may be implemented by programming on the mobile station. In addition to memory or the like in the mobile station, the relevant programming may be stored at times in a general purpose computer, e.g., for loading into mobile stations.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the selection of one of the wireless access technologies supported by the transceiver available from the mobile communication network when the mobile station initiates an emergency call. The software code is executable by processor(s) of the mobile terminal device. In operation, the code is stored within the general-purpose computer platform. At other times, however, the software may be stored at other locations and/or transported for loading into the appropriate mobile stations. Execution of such code by a processor of the mobile station enables the station to implement the methodology for selection of one of the wireless access technologies supported by the transceiver available from the mobile communication network when the mobile station initiates an emergency call, in essentially the manner performed in the implementations discussed and illustrated herein.

FIG. 4 is a simplified functional block diagram of a computer that may be configured as a host or server, for example, to function as the PDE/SUPL 208 or the host computer of the PSAP 210 in the system of FIG. 2 and/or as a management server for downloading programming to a mobile station like that of FIG. 3. FIG. 5 is a simplified functional block diagram of a personal computer or other work station or terminal device. These general purpose platforms also may be used to load technology selection programming into mobile stations. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods for the selection of one of the wireless access technologies supported by the transceiver available from the mobile communication network when the mobile station initiates an emergency call outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the mobile stations, computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile service provide into the mobile station. For such communications, software elements may be carried as part of optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium or physical transmission medium. Non-volatile storage media include, for example, optical or magnetic disks, such as any of the storage devices in any computer(s) or the like, such as may be used to implement the aforementioned technology shown in the drawings. Volatile storage media include dynamic memory, such as main memory of such a computer platform. Tangible transmission media include coaxial cables; copper wire and fiber optics, including the wires that comprise a bus within a computer system. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method comprising steps of:
    upon detecting a start of an emergency call from a mobile station capable of supporting a plurality of wireless access technologies through a mobile communication network, determining one or more types of wireless access technologies available to the mobile station from the mobile communication network at the time of the emergency call, from among the plurality of wireless access technologies, wherein the wireless access technologies supported by the mobile station include two or more wireless access technologies selected from 1x Radio Transmission Technology (1xRTT), Long Term Evolution (LTE), and Evolution-Data Optimized (EvDO);
    comparing the determined one or more types of available wireless access technologies to a hierarchy regarding ability to determine location of the mobile station using each of the supported wireless access technologies to select a wireless access technology of the mobile communication network offering the ability to determine location of the mobile station during the emergency call,
    wherein the comparing step further includes:
        determining if the 1xRTT wireless access technology is available from among 1xRTT, LTE, and EvDO, upon determining 1xRTT is not available, determining if the LTE wireless access technology is available from among LTE and EvDO, and upon determining LTE is available, instructing the mobile station to operate in a LTE mode and select LTE measurements for position determination;

initiating a determination of the location of the mobile station for purposes of the emergency call via the mobile communication network, using the selected wireless access technology for making air interface measurements for position determination;

determining before the position determination is completed using LTE, that the mobile station is handed down to EvDO;

upon determining that the mobile station is handed down to EvDO, determining if 1xRTT is available; and upon determining 1 xRTT is available, instructing the mobile station to change the EvDO wireless access technology to a 1xRTT mode and select 1xRTT measurements for position determination while using EvDO air interface to transport 1xRTT measurements to a location server.

2. The method of claim 1, wherein the comparing step further includes:

upon determining 1xRTT is available, prior to determining if the LTE wireless access technology is available, instructing the mobile station to operate in a 1xRTT mode and select 1xRTT measurements for position determination.

3. An article of manufacture comprising:

programming for configuring a mobile station to implement the steps of the method of claim 1; and a non-transitory, machine readable storage medium bearing the programming.

4. A method comprising steps of:

after detecting a start of an emergency call from a mobile station capable of supporting a plurality of wireless access technologies through a mobile communication network, determining one or more types of wireless access technologies available to the mobile station from the mobile communication network at the time of the emergency call, from among the plurality of wireless access technologies, wherein the wireless access technologies supported by the mobile station include two or more wireless access technologies selected from 1x Radio Transmission Technology (1xRTT), Long Term Evolution (LTE), and Evolution-Data Optimized (EvDO);

comparing the determined one or more types of available wireless access technologies to a hierarchy regarding ability to determine location of the mobile station using each of the supported wireless access technologies to select a wireless access technology of the mobile communication network offering the ability to determine location of the mobile station during the emergency call, wherein the comparing step further includes:

determining if the 1 xRTT wireless access technology is available from among 1xRTT, LTE, and EvDO, upon determining 1xRTT is not available, determining if the LTE wireless access technology is available from among LTE and EvDO, and upon determining LTE is available, instructing the mobile station to operate in a LTE mode and select LTE measurements for position determination;

initiating a determination of the location of the mobile station for purposes of the emergency call via the mobile communication network, using the selected wireless access technology for making air interface measurements for position determination;

determining before the position determination is completed using LTE, that the mobile station is handed down to EvDO;

upon determining that the mobile station is handed down to EvDO, determining if 1xRTT is available; and upon determining the 1xRTT is not available, instructing the mobile station to send EvDO base station identifiers to a location server for position determination.

5. The method of claim 4, wherein the comparing step further includes:

upon determining 1xRTT is available, prior to determining if the LTE wireless access technology is available, instructing the mobile station to operate in a 1xRTT mode and select 1xRTT measurements for position determination.

6. An article of manufacture comprising:

programming for configuring a mobile station to implement the steps of the method of claim 4; and a non-transitory, machine readable storage medium bearing the programming.

7. A mobile station, comprising:

at least one wireless transceiver for calls through a mobile communication network and for determining location of the mobile station, the at least one wireless transceiver supporting a plurality of wireless access technologies including two or more wireless access technologies selected from 1x Radio Transmission Technology (1xRTT), Long Term Evolution (LTE), and Evolution-Data Optimized (EvDO);

a processor coupled to the at least one wireless transceiver, wherein the processor is configured to control the at least one wireless transceiver during emergency calls from the mobile station to perform functions, comprising functions to:

upon detecting a start of an emergency call from the mobile station, determine one or more types of wireless access technologies available to the mobile station from the mobile communication network;

based on a hierarchy regarding ability to determine location of the mobile station using each of the supported wireless access technologies, determine if the 1xRTT wireless access technology is available from among 1xRTT, LTE, and EvDO;

upon determining 1xRTT is not available, determine if the LTE wireless access technology is available from among LTE and EvDO; and upon determining LTE is available, instruct the mobile station to operate in a LTE mode and select LTE measurements for position determination;

initiate a determination of the location of the mobile station for purposes of the emergency call through the mobile communication network, using the selected wireless access technology for making air interface measurements for position determination;

determine before the position determination is completed using LTE, that the mobile station is handed down to EvDO;

upon determining that the mobile station is handed down to EvDO, determine if 1xRTT is available; and upon determining 1 xRTT is available, instruct the mobile station to change the EvDO wireless access technology to a 1xRTT mode and select 1xRTT measurements for position determination while using EvDO air interface to transport 1xRTT measurements to a location server.

8. The mobile station of claim 7, wherein the functions further include functions to:
upon determining 1xRTT is available, prior to determining if the LTE wireless access technology is available, instruct the mobile station to operate in a 1xRTT mode and select 1xRTT measurements for position determination.

9. A method comprising steps of:
upon detecting a start of an emergency call from a mobile station capable of supporting a plurality of wireless access technologies through a mobile communication network, determining one or more types of wireless access technologies available to the mobile station from the mobile communication network at the time of the emergency call, from among the plurality of wireless access technologies, wherein the wireless access technologies supported by the mobile station include two or more wireless access technologies selected from 1x Radio Transmission Technology (1xRTT), Long Term Evolution (LTE), and Evolution-Data Optimized (EvDO);

comparing the determined one or more types of available wireless access technologies to a hierarchy regarding ability to determine location of the mobile station using each of the supported wireless access technologies to select a wireless access technology of the mobile communication network offering the ability to determine location of the mobile station during the emergency call, wherein the comparing step further includes:
determining if the 1 xRTT wireless access technology is available from among 1 xRTT, LTE, and EvDO, upon determining 1xRTT is not available, determining if the LTE wireless access technology is available from among LTE and EvDO, and upon determining LTE is available, instructing the mobile station to operate in a LTE mode and select LTE measurements for position determination;

initiating a determination of the location of the mobile station for purposes of the emergency call via the mobile communication network, using the selected wireless access technology for making air interface measurements for position determination;

determining that the mobile station is handed down to EvDO;

determining if the mobile station is in a hybrid mode with 1xRTT; and after determining that the mobile station is in the hybrid mode, instructing the mobile station to operate in a 1xRTT mode and make 1xRTT air interface measurements for position determination to support a user plane positioning protocol.

10. The method of claim 9, wherein, upon determining that the mobile station is handed down to EvDO, whether the mobile station is in a hybrid mode with 1xRTT is determined.

11. An article of manufacture comprising:
programming for configuring a mobile station to implement the steps of the method of claim 9; and
a non-transitory, machine readable storage medium bearing the programming.

* * * * *